United States Patent
Ishishita

(10) Patent No.: US 9,758,155 B2
(45) Date of Patent: Sep. 12, 2017

(54) CONTROL APPARATUS FOR VEHICLE

(71) Applicant: TOYOTA JIDOSHA KABUSHIKI KAISHA, Toyota-shi, Aichi (JP)

(72) Inventor: Teruo Ishishita, Miyoshi (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/786,260

(22) PCT Filed: Apr. 25, 2013

(86) PCT No.: PCT/JP2013/002820
§ 371 (c)(1),
(2) Date: Oct. 22, 2015

(87) PCT Pub. No.: WO2014/174551
PCT Pub. Date: Oct. 30, 2014

(65) Prior Publication Data
US 2016/0137186 A1    May 19, 2016

(51) Int. Cl.
| B60W 20/14 | (2016.01) |
| B60L 3/00 | (2006.01) |
| B60L 11/18 | (2006.01) |
| B60W 10/08 | (2006.01) |
| B60W 10/18 | (2012.01) |

(Continued)

(52) U.S. Cl.
CPC ............ *B60W 20/14* (2016.01); *B60K 6/445* (2013.01); *B60L 3/0046* (2013.01); *B60L 11/1861* (2013.01); *B60W 10/06* (2013.01); *B60W 10/08* (2013.01); *B60W 10/18* (2013.01); *B60W 10/26* (2013.01); *B60W 20/00* (2013.01); *B60W 20/16* (2016.01); *B60W 2510/244* (2013.01); *B60W 2510/246* (2013.01); *B60W 2560/00* (2013.01); *B60W 2710/06* (2013.01); *B60W 2710/08* (2013.01); *Y02T 10/6239* (2013.01); *Y10S 903/907* (2013.01)

(58) Field of Classification Search
CPC ....... B60W 10/24; B60W 10/26; B60W 20/00
See application file for complete search history.

(56) References Cited

U.S. PATENT DOCUMENTS

| 2012/0072062 A1* | 3/2012 | Ando | .................. B60K 6/365 701/22 |
| 2012/0226402 A1* | 9/2012 | Minamiura | ............... B60T 1/10 701/22 |

FOREIGN PATENT DOCUMENTS

| CN | 102653238 A | 9/2012 |
| JP | 2007-204004 A | 8/2007 |

(Continued)

*Primary Examiner* — Jerrah Edwards
*Assistant Examiner* — Kelly D Williams
(74) *Attorney, Agent, or Firm* — Sughrue Mion, PLLC

(57) ABSTRACT

A control apparatus for a hybrid vehicle including an engine and a motor, includes a controller to update an allowable input current value in accordance with the battery state and to control an input to the battery, the allowable input current value being the maximum current value to which the battery input is permitted. The controller performs control such that limitation of the battery input in accordance with the allowable input current value is not performed if a deterioration degree of a catalyst for purifying an exhaust gas from the engine is larger than a predetermined value when an engine braking force and a regenerative motor braking force are applied during deceleration.

6 Claims, 6 Drawing Sheets

(51) Int. Cl.
*B60K 6/445* (2007.10)
*B60W 10/06* (2006.01)
*B60W 10/26* (2006.01)
*B60W 20/16* (2016.01)
*B60W 20/00* (2016.01)

(56) References Cited

FOREIGN PATENT DOCUMENTS

| JP | 2011-079447 A | 4/2011 |
| JP | 2012-182934 A | 9/2012 |

* cited by examiner

CONTROL APPARATUS FOR VEHICLE

CROSS REFERENCE TO RELATED APPLICATIONS

This is a National Stage of International Application No. PCT/JP2013/002820filed Apr. 25, 2013, the contents of which are incorporated herein by reference in its entirety.

TECHNICAL FIELD

The present invention relates to a control apparatus for a hybrid vehicle including a motor for running to be driven with electric power supplied by a power source apparatus and an internal-combustion engine.

BACKGROUND ART

A hybrid vehicle includes an internal-combustion engine and a motor for running. The hybrid vehicle drives the motor with electric power supplied by a power source apparatus mounted thereon and uses the motor as a driving source for the vehicle.

The hybrid vehicle can run by using one or both of the internal-combustion engine and the motor for running as the driving source. For example, the hybrid vehicle can stop the engine and use only the motor as the driving source for running, or can use both the internal-combustion engine and the motor as the driving source for running. The power source apparatus can be charged with electric power from regenerative braking in decelerating the vehicle or electric power generated by the internal-combustion engine.

For example, a lithium-ion secondary battery for use as the power source apparatus may experience precipitation of lithium metal on the surface of a negative electrode due to use conditions. Since the precipitation of lithium metal may reduce the battery performance, control is performed to adjust (limit) an electric power which can be input to the power source apparatus in order to suppress the precipitation of lithium metal.

When an accelerator pedal is released to brake the vehicle, however, the limitation of the electric power which can be input to the power source apparatus reduces the regenerative braking force (regenerative brake) of the motor, and accordingly, it is necessary to apply a larger braking force of an engine brake from rotational resistance of the engine. Since the application of the larger braking force of the engine brake increases the RPM of the engine, the engine emits more exhaust gas and air to be supplied to a catalyst for exhaust gas purification. The increased amounts of exhaust gas and air to be supplied to the catalyst for exhaust gas purification may promote the deterioration of the catalyst for exhaust gas purification.

PRIOR ART DOCUMENT

Patent Document

[Patent Document 1] Japanese Patent Laid-Open No. 2012-182934

DISCLOSURE OF THE INVENTION

Problems to be Solved by the Invention

It is an object of the present invention to provide a technique utilized in a hybrid vehicle including an internal-combustion engine and a motor for running to control the charge of a power source apparatus with a regenerative power such that the deterioration of a catalyst for exhaust gas purification is taken into account.

Means for Solving the Problems

A vehicle control apparatus according to the present invention is a control apparatus for a hybrid vehicle including an engine, a motor for running the vehicle, and a battery configured to supply an electric power to the motor for running. The vehicle control apparatus includes a controller configured to update an allowable input current value in accordance with the state of the battery and to control an input to the battery, the allowable input current value being a maximum current value to which the input to the battery is permitted.

The controller performs control such that limitation of the input to the battery in accordance with the allowable input current value is not performed if a deterioration degree of a catalyst for purifying an exhaust gas from the engine is larger than a predetermined value when a braking force of an engine brake and a regenerative braking force of the motor for running are applied to the vehicle during deceleration of the vehicle.

The controller can perform control such that the limitation of the input to the battery in accordance with the allowable input current value is not performed when the deterioration degree of the catalyst is larger than a first predetermined value and a battery deterioration degree of the battery is smaller than a second predetermined value.

The controller can perform control such that the limitation of the input to the battery in accordance with the allowable input current value is performed when the deterioration degree of the catalyst is smaller than the first predetermined value or the battery deterioration degree of the battery is larger than the second predetermined value.

The controller can perform first input control in which the allowable input current value is updated in accordance with the temperature and/or the SOC of the battery and the input to the battery is controlled and second input control in which the allowable input current value is updated in accordance with the charge state of the battery and the input to the battery is controlled. The controller can perform control such that the limitation of the input to the battery in accordance with the allowable input current value in the second input control is not performed, and can permit an input of a regenerative power exceeding an input limit value of the battery based on the allowable input current value in the second input control in a range not exceeding an input limit value of the battery based on the allowable input current value in the first input control.

The controller can determine whether or not the RPM of the engine detected by an RPM sensor exceeds a predetermined engine RPM threshold value, and can calculate the deterioration degree of the catalyst based on a time period for which the engine is driven at an RPM exceeding the engine RPM threshold value, the number of times the engine RPM threshold value is exceeded, or an RPM difference between the RPM of the engine when the engine RPM threshold value is exceeded and the engine RPM threshold value. The engine RPM threshold value is a threshold value for identifying the state of promotion of deterioration of the catalyst involved in an increase in the engine RPM due to application of the braking force of the engine brake.

The controller can calculate the battery deterioration degree based on a time period for which the regenerative power exceeding the input limit value is input, the number of times the regenerative power exceeding the input limit value is input, or an input amount of the regenerative power exceeding the input limit value, when the input of the regenerative power exceeding the input limit value of the battery based on the allowable input current value is permitted.

The battery can be formed of a lithium-ion secondary battery. In this case, the controller can perform control to set the allowable input current value such that a negative electrode potential of the lithium-ion secondary battery is not to fall below a reference potential for indicating precipitation of lithium metal.

A control method according to the present invention is a control method, in a hybrid vehicle including an engine, a motor for running the vehicle, and a battery configured to supply an electric power to the motor for running, of updating an allowable input current value in accordance with the state of the battery and to control an input to the battery, the allowable input current value being a maximum current value to which the input to the battery is permitted. The control method includes the step of determining whether or not a deterioration degree of a catalyst for purifying an exhaust gas from the engine is larger than a predetermined value when a braking force of an engine brake and a regenerative braking force of the motor for running are applied to the vehicle during deceleration of the vehicle, and the step of performing control such that limitation of the input to the battery in accordance with the allowable input current value is not performed when the deterioration degree of the catalyst is larger than the predetermined value.

Advantage of the Invention

According to the present invention, the control is performed such that the limitation of the input to the battery in accordance with the allowable input current value is not performed when the catalyst deterioration degree is at a level where the promotion of deterioration is not allowable. This can increase the regenerative braking force during deceleration of the vehicle and hold the braking force of the engine brake low. As a result, the promotion of catalyst deterioration can be prevented.

MODE FOR CARRYING OUT THE INVENTION

A preferred embodiment of the present invention will hereinafter be described.
Embodiment 1

Figure 1:
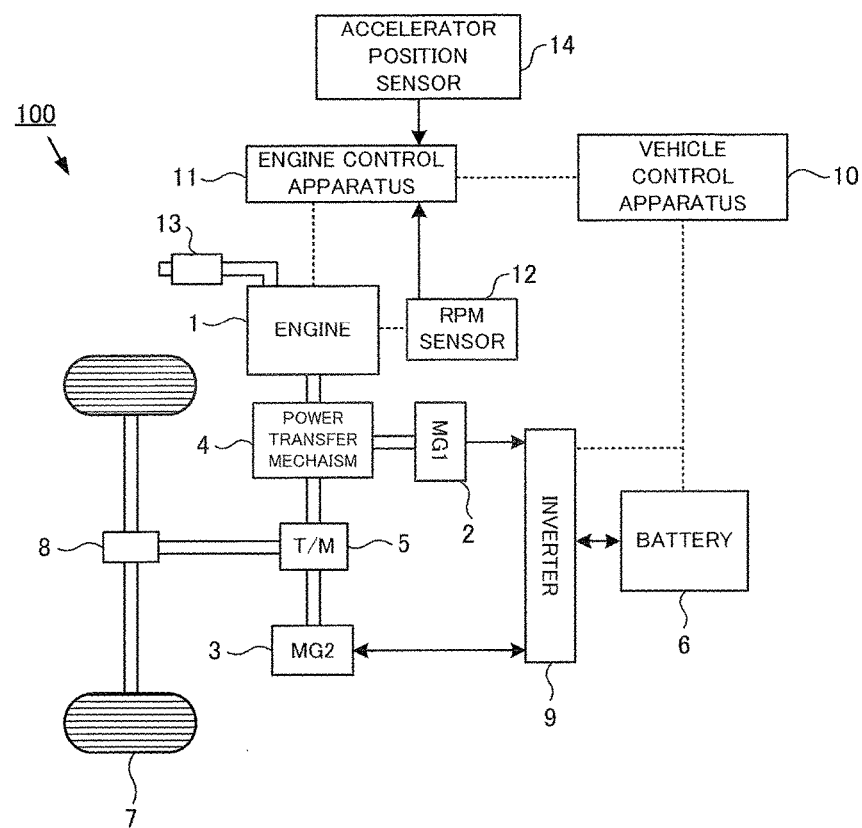
FIG. 1 A block diagram showing the configuration of a hybrid vehicle in Embodiment 1.

FIG. 1 to FIG. 10 are diagrams showing Embodiment 1. FIG. 1 is a block diagram showing the configuration of a hybrid vehicle according to the present embodiment. Although the hybrid vehicle is described as an example, a vehicle control apparatus in the present embodiment is applicable to a plug-in hybrid vehicle including a function of external charge from an external power source.

As shown in FIG. 1, a hybrid vehicle 100 includes an engine 1, a first motor generator (MG) 2, a second MG 3, a power transfer mechanism 4, a transmission (such as a continuously variable transmission and a decelerator) 5, and a battery 6, all of which are mounted thereon.

The engine 1 has an output shaft connected to the power transfer mechanism 4. The power transfer mechanism 4 is coupled to an input shaft of the transmission 5 and to an input shaft of the first MG (motor for power generation) 2. An output shaft of the transmission 5 is coupled to a differential gear 8 of a driving wheel 7 to transfer the power of the engine 1 to the driving wheel 7 through the power transfer mechanism 4. The output shaft of the transmission 5 is also coupled to an output shaft of the second MG (motor for running) 3. The power of the second MG 3 is transferred to the driving wheel 7 through the transmission 5.

The power transfer mechanism 4 divides the power generated by the engine 1 into two paths including a first path for transfer to the driving wheel 7 through the transmission 5 and a second path for transferring the power generated by the engine 1 to the first MG 2 for power generation. The power transfer mechanism 4 is controlled by a vehicle control apparatus 10, later described. The vehicle control apparatus 10 controls the powers transferred to the first and second paths and the ratio between them based on running control with the driving force of the engine 1 and charge control for the battery 6.

The battery 6 is a power source apparatus for supplying electric power to the second MG 3. The DC power from the battery 6 is converted into an AC power by an inverter 9 and supplied to the second MG 3. The second MG 3 is an AC motor such as a three-phase synchronous motor and a three-phase induction motor.

The inverter 9 converts the DC power output from the battery 6 into the AC power and outputs the AC power to the second MG 3. The second MG 3 receives the AC power output from the inverter 9 to generate a kinetic energy for running the hybrid vehicle 100. The kinetic energy generated by the second MG 3 is transferred to the driving wheel 7 through the transmission 5.

In braking of the hybrid vehicle 100 for decelerating or stopping the vehicle, the driving wheel 7 drives the second MG 3 through the transmission 5. The second MG 3 operates as a generator (power generator) and converts a kinetic energy generated in braking of the hybrid vehicle 100 into an electric energy (AC power).

The second MG 3 in the present embodiment serves as the driving source for running the vehicle to be driven with the electric power supplied from the battery 6 and serves also as a regenerative brake for converting a braking energy into an electric power. The electric power (regenerative energy) generated by the second MG 3 is sent to and stored in the battery 6 through the inverter 9. The inverter 9 converts the AC power generated by the second MG 3 into a DC power and outputs the DC power (regenerative power) to the battery 6.

Although the battery 6 is connected to the inverter 9 in the present embodiment, the present invention is not limited thereto. Specifically, the battery 6 may be connected to a step-up circuit which is connected to the inverter 9. The step-up circuit can be used to increase the voltage output from the battery 6. The step-up circuit can also reduce the voltage output from the inverter 9 to the battery 6.

The first MG 2 is a generator which is driven to rotate with the power of the engine 1 to generate an electric power and supplies the generated electric power to the battery 6 through the inverter 9. The first MG 2 can be formed of an AC motor such as a three-phase synchronous motor and a three-phase induction motor, similarly to the second MG 3.

The electric power generated by the first MG 2 can be supplied as the electric power for driving the second MG 3 or can be supplied as the electric power to be stored in the battery 6. For example, the first MG 2 can be controlled in accordance with the SOC (State Of Charge) of the battery 6 or the output required of the hybrid vehicle 100. The second MG 3 can be controlled to be driven with one or both of the power stored in the battery 6 and the power generated by the first MG 2.

The engine 1 is a known internal-combustion engine which burns fuel to output power such as a gasoline engine or a diesel engine. The engine 1 is provided with an RPM sensor 12. The RPM sensor 12 detects the RPM of the engine 1 and outputs the detected RPM of the engine 1 (or a signal indicating the RPM) to an engine control apparatus 11. An accelerator position sensor 14 detects an accelerator opening (the amount of pressing of an accelerator pedal) and outputs it to the vehicle control apparatus 10.

An exhaust gas emitted from the engine 1 is discharged outside the vehicle through a purification apparatus 13. The purification apparatus 13 includes an exhaust gas purification catalyst (three-way catalyst) for purifying a toxic component such as carbon monoxide (CO), hydrocarbon (HC), and nitrogen oxide (Nox). The exhaust gas purification catalyst of the purification apparatus 13 can be formed of an oxidation catalyst such as platinum (Pt) and palladium (Pd), a reduction catalyst such as rhodium (Rh), and a promoter such as ceria ($CeO_2$). In this case, the action of the oxidation catalyst purifies CO and HC contained in the exhaust gas to water ($H_2O$) and carbon dioxide ($CO_2$), and the action of the reduction catalyst purifies NOx contained in the exhaust gas to nitrogen ($N_2$) and oxide ($O_2$).

The engine control apparatus 11 is an engine ECU for controlling the engine 1 based on an engine control signal from the vehicle control apparatus 10. The engine control apparatus 11 is connected to the vehicle control apparatus 10 serving as a main controller responsible for overall control of the vehicle. The engine control apparatus 11 controls the amount of fuel injection, the amount of air aspiration, the ignition time and the like in the engine 1 based on the values detected by sensors including the RPM sensor 12 so as to achieve operation at a target RPM and a target torque specified in the vehicle control apparatus 10.

Figure 2:
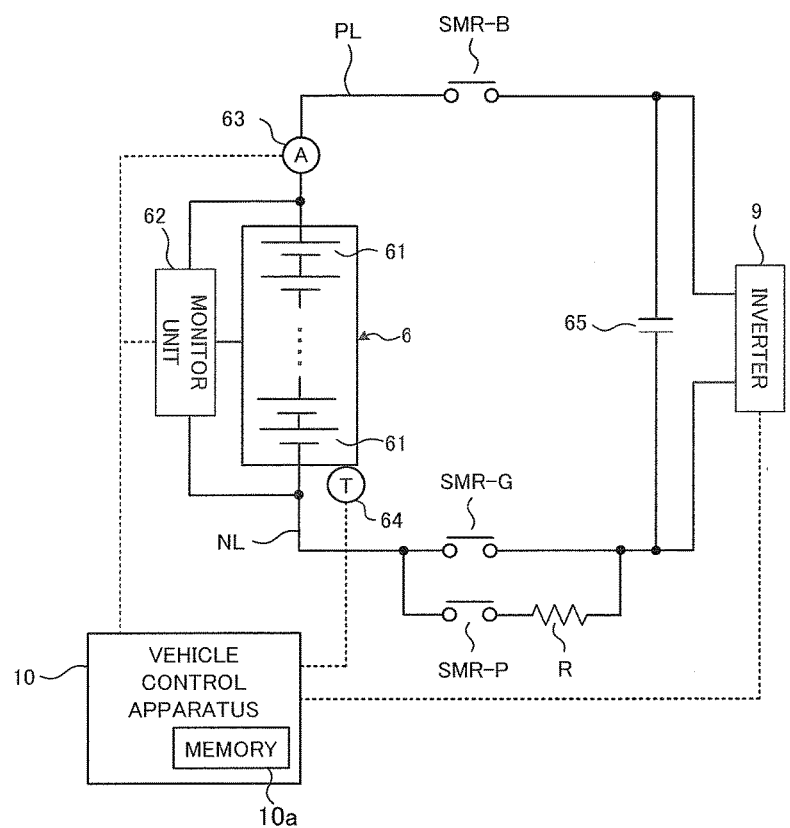
FIG. 2 A diagram showing an exemplary configuration of a battery system mounted on the hybrid vehicle in Embodiment 1.

The battery 6 is an assembled battery including a plurality of cells 61 electrically connected in series. FIG. 2 is a diagram showing an exemplary configuration of a battery system mounted on the hybrid vehicle 100 of the present embodiment.

A nonaqueous secondary battery such as a lithium-ion secondary battery can be used as the cell 61. The number of the cells 61 can be set as appropriate based on the output required of the battery 6 and the like. Although all the cells 61 are connected in series in the battery 6 of the present embodiment, a plurality of cells 61 connected in parallel may be included in the battery 6.

A positive electrode of the cell 61 is made of a material capable of absorbing and releasing ions (for example, lithium ions). Examples of the material of the positive electrode can include lithium cobaltate and lithium manganate. A negative electrode of the cell 61 is made of a material capable of absorbing and releasing ions (for example, lithium ions). An example of the material of the negative electrode can be carbon. In charging the cell 61, the positive electrode releases the ions into an electrolytic solution, and the negative electrode absorbs the ions in the electrolytic solution. In discharging the cell 61, the positive electrode absorbs the ions in the electrolytic solution, and the negative electrode releases the ions into the electrolytic solution.

A monitor unit 62 detects the voltage between terminals of the battery 6 and detects the voltage of each cell 61. The monitor unit 62 outputs the detection results to the vehicle control apparatus 10. The monitor unit 62 can detect the voltage value of each of the plurality of cells 61 or can detect the voltage of one block of cells consisting of a predetermined number of cells connected in series. The number of the cells 61 included in one block can be arbitrarily set.

A current sensor 63 detects a current flowing through the battery 6 and outputs the detection result to the vehicle control apparatus 10. Although the present embodiment includes the current sensor 63 provided on a positive electrode line PL connected to a positive electrode terminal of the battery 6, the present invention is not limited thereto. The current sensor 63 is only required to detect the current flowing through the battery 6, and the position to provide the current sensor 63 can be set as appropriate. For example, the current sensor 63 can be provided on a negative electrode line NL connected to a negative electrode terminal of the battery 6. A plurality of current sensors 63 may be used.

A temperature sensor 64 detects the temperature of the battery (battery temperature). The temperature sensor 64 outputs the detection result to the vehicle control apparatus 10. The temperature sensor 64 can be provided at one point in the battery 6 or can be provided at a plurality of different points in the battery 6. When a plurality of temperatures are detected in the battery 6, the lowest value, the highest value, the median value, or the average value of the plurality of detected temperatures can be used for the temperature of the battery 6 as appropriate.

A capacitor 65 is connected to the positive electrode line PL and the negative electrode line NL and smoothes voltage variations between the positive electrode line PL and the negative electrode line NL.

The positive electrode line PL and the negative electrode line NL are provided with a system main relay SMSR-B and a system main relay SMR-G, respectively. Each of the system main relays SMR-B and SMR-G is switched between ON and OFF in response to a control signal from the vehicle control apparatus 10.

The system main SMR-G is connected in parallel to a system main relay SMR-P and a current limiting resistor R.

The system main relay SMR-P and the current limiting resistor R are connected in series. The system main relay SMR-P is switched between ON and OFF in response to a control signal from the vehicle control apparatus 10. The current limiting resistor R is used to prevent a flow of inrush current through the capacitor 65 when the battery 6 is connected to a load (specifically, the inverter 9).

For connecting the battery 6 to the inverter 9, the vehicle control apparatus 10 first switches the system main relays SMR-B and SMR-P from OFF to ON. This causes an electric current to pass through the current limiting resistor R.

Next, the vehicle control apparatus 10 switches the system main relay SMR-G from OFF to ON and then switches the system main relay SMR-P from ON to OFF. This completes the connection between the battery 6 and the inverter 9 and the battery system shown in FIG. 2 is in Ready-On state. The vehicle control apparatus 10 receives information about ON/OFF of an ignition switch of the hybrid vehicle 100. The vehicle control apparatus 10 starts the battery system in response to switching of the ignition switch from OFF to ON.

On the other hand, when the ignition switch is switched from ON to OFF, the vehicle control apparatus 10 switches the system main relays SMR-B and SMR-G from ON to OFF. This breaks the connection between the battery 6 and the inverter 9 and the battery system is in Ready-Off state.

The vehicle control apparatus 10 serving as the main controller responsible for the overall control of the vehicle calculates the output required of the overall hybrid vehicle 100, for example, the required driving force in accordance with the amount of pressing of the accelerator pedal detected by the accelerator position sensor 14, and controls the output from the engine 1 and the input to and output from the battery 6 based on the calculated output required of the vehicle.

The vehicle control apparatus 10 in the present embodiment also serves as a battery ECU for managing the SOC and the deterioration state of the battery 6 and for controlling the charge/discharge operation of the battery 6. Alternatively, a battery ECU may be provided independently of the vehicle control apparatus 10. The control apparatuses including the vehicle control apparatus 10 and the engine control apparatus 11 may be formed of a single control apparatus, and the vehicle control apparatus 10 serving as the main controller may have the functions of the engine control apparatus 11 and of the independently provided battery ECU (battery control apparatus).

Each of the first MG 2 and the second MG 3 is provided with a rotational position sensor, not shown, for detecting the rotational position (angle) of the motor. As shown in FIG. 1, the first MG 2 and the second MG 3 are connected to the battery 6 through the inverter 9, and the inverter 9 bidirectionally converts the electric power between the first MG 2 and the second MG 3 and the battery 6 in accordance with a control signal from the vehicle control apparatus 10. The vehicle control apparatus 10 controls the electric power conversion in the inverter 9 such that the output torques of the first MG 2 and the second MG 3 match their torque command values.

When the second MG 3 is driven (in discharge), when the battery 6 is charged with the regenerative power generated by the second MG 3, and when the battery 6 is charged with the electric power from the first MG 2, currents I and voltages V are detected by the current sensor 63 and the monitor unit 62, respectively. These detection results are output to the vehicle control apparatus 10. The temperature of the battery 6 detected by the temperature sensor 64 is also output to the vehicle control apparatus 10 as appropriate.

As shown in FIG. 2, the vehicle control apparatus 10 includes a memory 10a. The memory 10a stores the values detected by the monitor unit 62, the current sensor 63, and the temperature sensor 64, the values of the SOC and full charge capacity calculated from the detection values, and various information for use in charge/discharge control. The memory 10a may be provided as a separate storage area externally connected to the vehicle control apparatus 10. In other words, the memory 10a can be contained in or externally attached to the vehicle control apparatus 10.

The vehicle control apparatus 10 selects the driving supply power based on the operation state and controls the running of the hybrid vehicle 10 by using the driving force from one or both of the engine 1 and the second MG 3.

For example, when the accelerator opening is small or the vehicle speed is low, the driving force from the engine 1 is not used (with the engine 1 stopped), and only the second MG 3 is used as the driving source to control the running of the hybrid vehicle (EV running mode). It should be noted that, during the control of running of the hybrid vehicle using only the second MG 3 as the driving source, the engine 1 can be driven to control the power generation in the first MG 2.

When the accelerator opening is large or the vehicle speed is high, or when the SOC of the battery 6 is low, the running control is performed with the engine 1 used as the driving source. The vehicle control apparatus 10 can control the running of the hybrid vehicle by using only the engine 1 or both the engine 1 and the second MG 3 as the driving source (HV running mode).

As described above, the vehicle control apparatus 10 calculates the output required of the overall hybrid vehicle 100 to automatically select the driving source based on the operation state, controls the engine 1 through the engine control apparatus 11 and controls the charge/discharge of the battery 6, and achieves the running control for the vehicle using the driving force from one or both of the engine 1 and the second MG 3.

Figure 3:
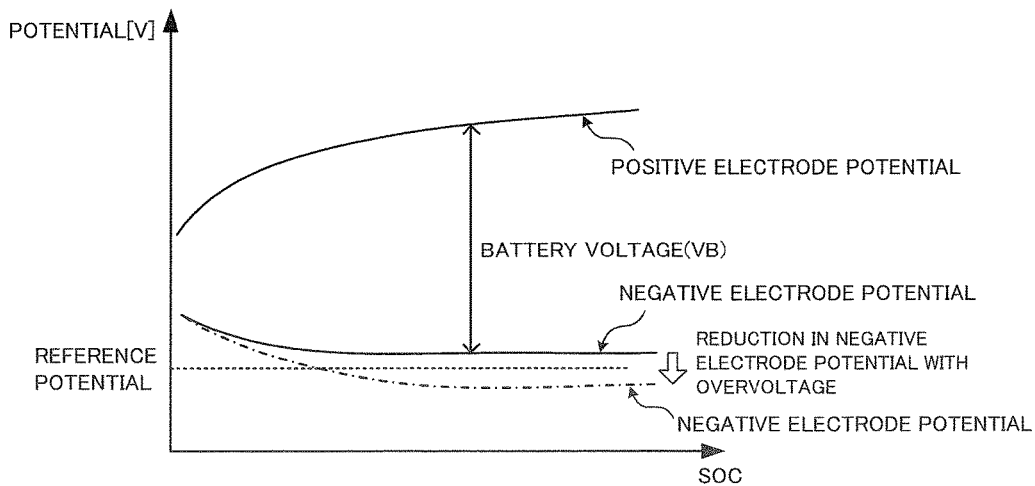
FIG. 3 A graph showing changes in positive electrode potential and negative electrode potential with respect to the SOC of a battery mounted on the hybrid vehicle in Embodiment 1.

Next, description is made of the charge/discharge control for the battery 6 in the hybrid vehicle 100 of the present embodiment. FIG. 3 is a graph showing changes in positive electrode potential and negative electrode potential with respect to the SOC of the battery 6. In the following description, it is assumed that a current value IB of the battery 6 has a positive value (IB>0) in discharge of the battery 6 and a negative value (IB<0) in charge of the battery 6.

When the cells 61 constituting the battery 6 are charged, a voltage value VB of the cell 61 is increased. As shown in FIG. 3, the voltage value VB of the cell 61 corresponds to a difference between the positive electrode potential and the negative electrode potential. As the charge of the cell 61 proceeds, the positive electrode potential is increased and the negative electrode potential is reduced. If the negative electrode potential falls below a reference potential (for example, 0 V), lithium metal may precipitate on the surface of the negative electrode.

While the cell 61 is energized, an overvoltage occurs. The overvoltage is the amount of voltage change associated with the internal resistance of the cell 61. When the energization of the cell 61 is stopped, the overvoltage is reduced. When the cell 61 is charged, the voltage value VB of the cell 61 (CCV: Closed Circuit Voltage) is increased to a level higher than the Open Circuit Voltage (OCV) of the cell 61 by the overvoltage. Thus, the negative electrode potential may fall below the reference potential depending on the magnitude of the overvoltage.

In the present embodiment, to prevent the precipitation of lithium metal, an allowable input current value is set and controlled such that an input current value (charge current value) of the cell (battery 6) does not exceed the allowable current value. The allowable input current value is the maximum current value allowed in charging the cell 61.

When the allowable input current value is increased, the current value in charging the cell 61 can be increased to improve the input performance of the cell 61. When the allowable input current value is reduced, the current value in charging the cell 61 cannot be increased and the charge of the cell 61 tends to be limited.

The allowable input current value is set as described below, and the setting of the allowable input current value is performed by the vehicle control apparatus 10.

First, when no charge/discharge history is present for the battery 6, in other words, when the battery 6 is charged or discharge for the first time, the allowable input current value Ilim(t) is calculated on the basis of the following expression (1):

[Expression 1]

$$I_{lim}[t] = I_{lim}[0] - \int_0^t F(IB[t], TB[t], SOC[t])dt - \int_0^t G(t, TB[t], SOC[t])dt (I_{lim}[0] \le I_{lim}[t] < 0) \quad (1)$$

In the expression (1), Ilim[0] represents the maximum allowable input current value at which the precipitation of lithium metal within a unit time can be prevented when the battery 6 with no charge/discharge history is charged. The allowable input current value Ilim[0] can be previously determined by experiment or the like, and the information about the allowable input current value Ilim[0] can be stored in the memory 10*a*.

In the expression (1), a second term of a right side is represented as a function F of the current value IB, the battery temperature TB, and the SOC (State Of Charge). Thus, the function F can be calculated by specifying the current value IB, the battery temperature TB, and the SOC. The current value IB, the battery temperature TB, and the SOC can be given by using their values at a time t. The SOC refers to the proportion of the present charge capacity to the full charge capacity.

The SOC of the battery 6 or the cell 61 can be estimated with a known method. For example, the SOC of the battery 6 (cell 61) can be estimated by summing the current values IB when the battery 6 (cell 61) is charged and discharged. Alternatively, since the OCV and the SOC have a predetermined correspondence, the SOC associated with the OCV can be specified by measuring the OCV of the battery 6 (cell 61) once the correspondence is determined.

When the charge is continued from the state with no charge/discharge history to the time t, the second term of the right side in the expression (1) represents the amount by which the allowable input current value Ilim is reduced per unit time, and the amount is subtracted from the allowable input current value Ilim[0]. When the discharge is continued from the state with no charge/discharge history the time t, the second term of the right side in the expression (1) represents the amount by which the allowable input current value Ilim is increased (recovered) per unit time, and the amount is added to the allowable input current value Ilim[0].

A third term of the right side in the expression (1) is represented as a function G of the time t, the battery temperature TB, and the SOC. Thus, the function G can be calculated by specifying the time t, the battery temperature TB, and the SOC. The battery temperature TB and the SOC can be given by using their values at the time t. The value of the third term of the right side in the expression (1) represents the amount by which the allowable input current value Ilim is increased (recovered) per unit time when the battery 6 remains left standing. Leaving the battery 6 standing refers to the state in which the charge or discharge of the battery is stopped (non-energized state).

When the battery 6 has a charge/discharge history, in other words, after the battery 6 is charged or discharged, the allowable input current value Ilim[t] is calculated on the basis of the following expression (2):

[Expression 2]

$$I_{lim}[t] = I_{lim}[t-1] - f(IB[t], TB[t], SOC[t])dt - g(TB[t], SOC[t])dt \times \frac{I_{lim}[0] - I_{lim}[t-1]}{I_{lim}[0]} \quad (2)$$

$$\beta = g(TB[t], SOC[t])dt \quad (3)$$

In the expression (2), Ilim[t] represents the allowable input current value at the time t (present time), and Ilim[t−1] represents the allowable input current value at a time t−1 (previous time). A second term of a right side in the expression (2) is represented as a function f of the current value IB, the battery temperature TB, and the SOC.

The function f depends on the current value IB, the battery temperature TB, and the SOC. Thus, the value of the second term of the right side in the expression (2) can be calculated by specifying the current value IB, the battery temperature TB, and the SOC. The current value IB, the battery temperature TB, and the SOC can be given by using their values at the time t.

In charging the battery 6, the value of the second term of the right side in the expression (2) represents the amount by which the allowable input current value Ilim is reduced per unit time (reduction amount), and the amount is subtracted from the allowable input current value Ilim[t−1]. Since the current value IB during charge has a negative value as described above, the allowable input current value approaches 0 A when the allowable input current value Ilim is reduced.

In discharging the battery 6, the value of the second term of the right side in the expression (2) represents the amount by which the allowable input current value Ilim is added (recovered) per unit time (recovery amount), and the amount is added to the allowable input current value Ilim[t−1]. When the allowable input current value Ilim Is increased, the allowable input current value moves away from 0 A.

A third term of the right side in the expression (2) is represented by a function g of the battery temperature TB and the SOC, and the allowable input current values Ilim[0] and Ilim[t−1]. As shown in the expression (3), the function g is represented as a coefficient β. The coefficient β depends on the battery temperature TB and the SOC. Thus, the coefficient β associated with the battery temperature TB and the SOC can be specified by previously determining a map representing the correspondence between the coefficient β, the battery temperature TB, and the SOC. The battery temperature TB and the SOC can be given by using their values at the time t.

The map representing the correspondence between the coefficient β, the battery temperature TB, and the SOC can be stored in the memory 10*a*. The value of the third term of the right side in the expression (2) represents the amount by which the allowable input current value Ilim is increased (recovered) per unit time when the battery 6 remains left standing. The value of the third term of the right side in the expression (2) is added to the allowable input current value Ilim[t−1].

When the allowable input current value is 0 A, the lithium ions in a negative electrode active material of the cell 61 are saturated. Thus, the value of Ilim[0]−Ilim[t−1] represents the amount of lithium ions in the negative electrode active material. As the amount of lithium ions in the negative electrode active material is reduced, the recovery amount can be increased.

The recovery amount at the time t depends on the recovery amount at the time t−1, and the recovery amount at the time t−1 is represented by Ilim[0]−Ilim[t−1]. In the third term of the right side in the expression (2), Ilim[0]−Ilim[t−1] is divided by Ilim[0] in order to make the value of Ilim[0]−Ilim[t−1] dimensionless. The result of the division can be multiplied by the coefficient β to obtain the recovery amount per unit time.

The allowable input current value Ilim[t] set in this manner can be used to perform control for limiting the charge power in the battery 6 of the present embodiment as described below.

The allowable input current value Ilim[t] is calculated at predetermined intervals while the battery 6 is charged or discharged or while the battery 6 is left standing. Specifically, the allowable input current value Ilim[t] is updated each time a predetermined time period corresponding to the interval between the time t and the time t−1 elapses. The allowable input current value Ilim[t] is used only in controlling the charge of the battery 6.

After the calculation of the allowable input current value Ilim[t], the vehicle control apparatus 10 controls the input/output (charge/discharge) of the battery 6 based on the allowable input current value Ilim[t]. For controlling the input to the battery 6, an input limit value (electric power) Win[t] is set, and the input to the battery 6 is controlled such that the input power to the battery 6 does not exceed the input limit value Win[t]. The input limit value Win[t] can be set as described below, for example.

The value for limiting the charge/discharge power in the battery 6 also has a positive value in discharge and a negative value in charge of the battery 6. Thus, an output limit value Wout is zero or a positive value (Wout≥0) and the input limit value Win is zero or a negative value (Win≤0).

Figure 4:
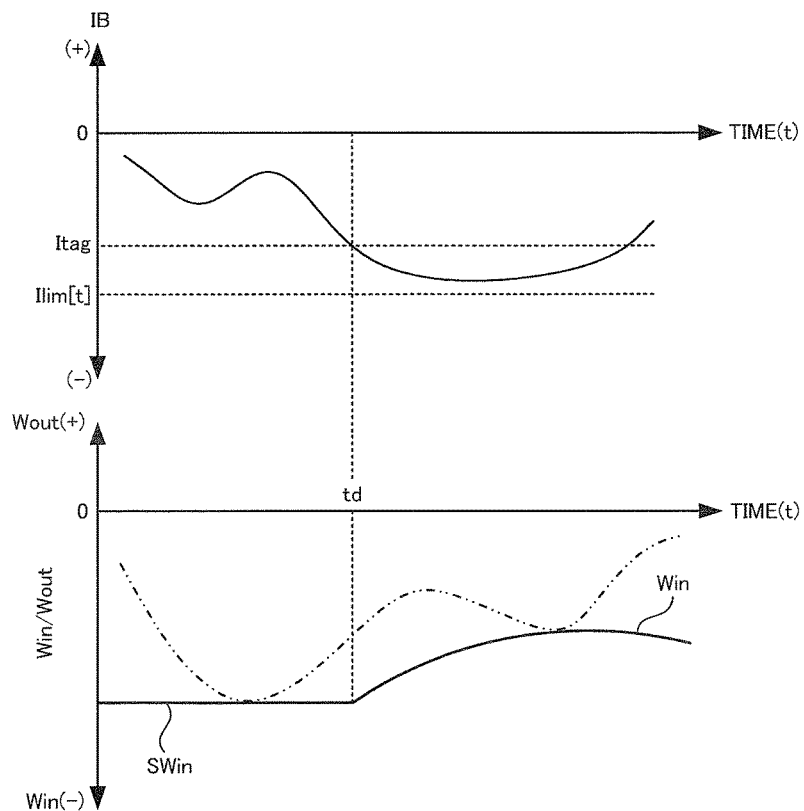
FIG. 4 Graphs for describing the processing of limiting an allowable input power in the battery of Embodiment 1.

FIG. 4 shows graphs representing the relationship between the current value IB and the input limit value Win[t] of the battery 6 in the control for preventing lithium precipitation. The vehicle control apparatus 10 calculates an input current limit value Itag based on the allowable input current value Ilim[t].

The input current limit value Itag is a value for specifying the input limit value Win[t]. Specifically, as shown in FIG. 4, the vehicle control apparatus 10 offsets the allowable input current value Ilim[t] toward 0 A by a predetermined amount to calculate the input current limit value Itag. This causes the input current limit value Itag to be closer to 0 A than the allowable input current value Ilim[t], so that the input to the battery 6 is more likely to be limited.

The margin between the allowable input current value Ilim[t] and the input current limit value Itag allows the current value IB to fall below the allowable input current value Ilim[t] less easily. In the control of the input to the battery 6 based on the input current limit value Itag, the limitation of the input to the battery 6 is started at the time when the current value IB reaches the input current limit value Itag. Even when the current IB falls below the input current limit value Itag due to delayed control or the like, the current value IB can be prevented from reaching the allowable input current value Ilim[t].

Next, the vehicle control apparatus 10 calculates the input limit value Win[t] based on the input current limit value Itag. Once the input current limit value Itag is set, the input limit value Win[t] can be set. When the input limit value Win[t] is set, the vehicle control apparatus 10 adjusts a torque command for the second MG 3 such that the input power to the battery 6 is equal to or lower than the input limit value Win[t].

For example, the input limit value Win[t] can be calculated on the basis of the following expression (4):

[Expression 3]

$$W_{in}[t]=SW_{in}[t]-K_p\times\{IB[t]-I_{tag1}[t]\}-K_i\times\int\{IB[t]-I_{tag2}[t]\}dt \quad (4)$$

In the expression (4), SWin[t] represents the upper limit value of the input limit value Win previously set by considering the input characteristics or the like of the battery 6. The information about the input limit value SWin[t] can be stored in the memory 10a.

The input limit value SWin[t] can be changed, for example, depending on the battery temperature TB and the SOC.

Figure 5:
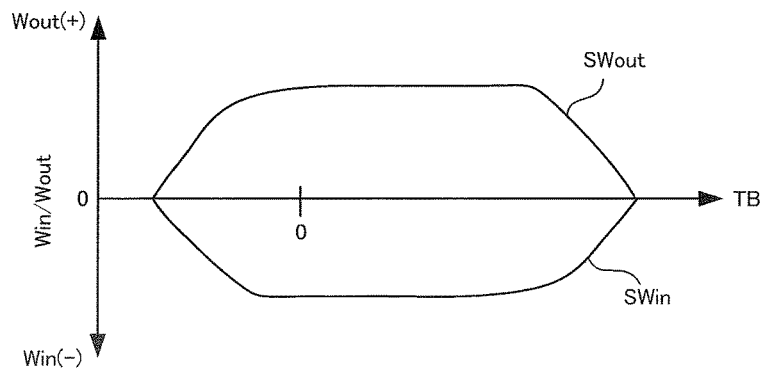
FIG. 5 A graph showing the relationship between a battery temperature and an input limit value in Embodiment 1.
Figure 6:
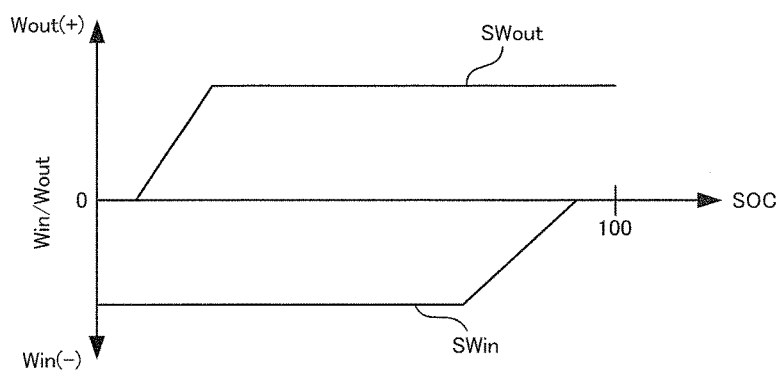
FIG. 6 A graph showing the relationship between the SOC and the input limit value in Embodiment 1.

FIG. 5 is a graph showing the relationship between the battery temperature TB and the input limit value SWin[t] of the battery 6. In FIG. 5, the vertical axis represents the input limit value of the battery 6, and the horizontal axis represents the battery temperature TB of the battery 6. FIG. 6 is a graph showing the relationship between the SOC and the input limit value SWin[t] of the battery 6. In FIG. 6, the vertical axis represents the input limit value of the battery 6 and the horizontal axis represents the SOC of the battery 6.

It is known that, as the temperature of the battery 6 rises, the deterioration thereof is promoted. As shown in FIG. 5, at higher temperatures, the input limit value SWin[t] can be set to be reduced as the temperature rises. The upper limit value is set to be gradually reduced in this manner since the charge efficiency is reduced in the charge at higher battery temperatures TB and the temperature rises with the reduced charge efficiency.

When the battery 6 is at lower temperatures, the internal resistance is increased. If a large charge current flows in this situation, the voltage value VB of the battery 6 is increased. To protect the battery 6 and the components through which the current flows, the input limit value SWin[t] can be set to be reduced as the battery temperature TB drops in order to avoid the flow of such a large current at lower temperatures.

As shown in FIG. 6, as the SOC of the battery 6 is increased, the charge efficiency is reduced and heat is produced due to reaction heat resulting from the reduced charge efficiency. To prevent this, the input limit value SWin[t] can be set to be reduced as the SOC of the battery 6 is increased.

As described above, the input limit value SWin[t] can be set in accordance with the battery temperature TB and the SOC. By previously determining the correspondence between the input limit value SWin[t] and the battery temperature TB (and/or SOC) as the example shown in FIG. 5, the battery temperature TB (and/or SOC) can be detected to specify the input limit value SWin[t].

In the present embodiment, the input limit value SWin[t] set in accordance with the battery temperature TB and the SOC of the battery 6 is used as the base (upper limit value)

of the input limit value in the battery 6 to calculate the input limit value Win[t] based on the allowable input current value Ilim[t]. Specifically, the vehicle control apparatus 10 performs first input control of controlling the input to the battery 6 while updating the allowable input current value (input limit value SWin) in accordance with the battery temperature TB and/or SOC of the battery 6 and second input control of controlling the input to the battery 6 while updating the allowable input current value Ilim[t] in accordance with the charge state of the battery 6. Thus, the input limit value SWin[t] is the maximum value (upper limit value) of the input power allowable for the battery 6, and the input limit value Win[t] set on the basis of the allowable input current value Ilim[t] is the input limit value limited to a larger extent (to a smaller absolute value) within a range not exceeding the input limit value SWin[t].

In the expression (4), Kp and Ki represent preset gains. Itag1 and Itag2 represent input current limit values and correspond to the input current limit value Itag described above. In the expression (4), the two input current limit values Itag1 and Itag2 are set as the input current limit value Itag. The input current limit values Itag1 and Itag2 may be equal to or different from each other.

Although the input current limit value Itag is set in the above description, the present invention is not limited thereto. Specifically, the input limit value Win[t] can be set on the basis of the allowable input current value Ilim[t] without setting the input current limit value Itag.

According to the present embodiment, as shown in the expression (2), the allowable input current value Ilim[t] is set by considering the reduction amount per unit time and the recovery amount per unit time. This can achieve the setting of the allowable input current value Ilim[t] in view of the charge/discharge history of the cell 61 up to the present time. The input to the battery 6 can be controlled on the basis of the allowable input current value Ilim[t] to prevent the negative electrode potential from falling below the reference potential.

The expressions (1) and (2) show the allowable input current value Ilim[t] when the deterioration of the cell 61 is not considered, and does not take account of the degree of deterioration of the cell 61 (battery 6). To factor in the deterioration of the cell 61 due to use (charge and discharge), the allowable input current value Ilim[t] with the deterioration of the cell 61 taken into account can be set. The allowable input current value Ilim_d[t] with the deterioration of the cell 61 taken into account can be calculated on the basis of the following expression (5):
[Expression 4]

$$I_{lim\_d}[t] = I_{lim}[t] \times \eta \quad (5)$$

In the expression (5), $\eta$ represents a deterioration coefficient. The allowable input current value Ilim[t] shown in the expressions (1) and (2) can be multiplied by the deterioration coefficient $\eta$ to calculate the allowable input current value Ilim_d[t] with the deterioration of the cell 61 taken into account. The deterioration coefficient $\eta$ can be previously set such that a smaller deterioration coefficient $\eta$ is set as the degree of deterioration is higher and that a larger deterioration coefficient $\eta$ is set as the degree of deterioration is lower. The information about the deterioration coefficient $\eta$ can be stored in the memory 10a.

The deterioration coefficient $\eta$ can be determined in accordance with the period of use of the cell 61 (battery 6), for example. Assuming that the degree of deterioration is zero when the period of use of the cell 61 is zero (for example, in the initial stage after manufacture), the degree of deterioration is higher as the period of use is longer, and the deterioration coefficient $\eta$ can be set in accordance with the degree of deterioration. For example, a value smaller than one can be used as the deterioration coefficient $\eta$. Since the lithium metal may tend to be precipitated as the deterioration of the cell 61 proceeds, the input to the cell 61 is preferably limited. The use of the deterioration coefficient $\eta$ of a value smaller than one can set the allowable input current value Ilim_d[t] to be smaller than the allowable input current value Ilim[t] to limit the input to the cell 61. The control of the input to the cell 61 (battery 6) based on the allowable input current value Ilim_d[t] readily prevents the precipitation of lithium metal.

The charge/discharge control for the battery 6 using the input limit value Win[t] limited not to fall below the allowable input current value in order to prevent the precipitation of lithium metal as described above prevents a reduction in battery performance. The limitation of the input power to the battery 6, however, may promote the deterioration of the catalyst in the purification apparatus 13 of the engine 1.

In the hybrid vehicle 100, the braking force applied to the vehicle when the accelerator pedal is released to brake the vehicle includes not only the braking force obtained from direct suppression of the rotation of the driving wheel 7 in accordance with the amount of pressing of the brake pedal (the force suppressing the rotation of the driving wheel 7 by pressing of a brake pad against a brake disk provided for the driving wheel 7) but also the regenerative braking force from the second MG 3 (regenerative brake) and the braking force of the engine brake from rotational resistance of the engine.

When the amount of pressing of the accelerator pedal detected by the accelerator position sensor 14 is zero (or a reference value), the vehicle control apparatus 10 can find that the accelerator pedal is released, in other words, an OFF state in which the accelerator pedal is not pressed. The cases in which the accelerator pedal is released include not only the case in which the amount of pressing of the accelerator pedal is zero but also the case in which the amount of the pressing of the accelerator pedal is reduced since the pedal is returned after a predetermined amount of pressing.

When the accelerator pedal is released to brake the vehicle, the vehicle control apparatus 10 charges the battery 6 with the regenerative power generated by the second MG 3 in accordance with the input limit value Win[t]. In other words, the vehicle control apparatus 10 performs controls such that the second MG 3 serves as the regenerative brake to apply the regenerative braking force to the vehicle.

When the input limit value Win[t] is limited to a larger extent than the input limit value SWin[t] (Win[t]<SWin[t]) in order to prevent the precipitation of lithium metal as described above, however, the amount of charge of the battery 6 with the regenerative power is reduced. In other words, the input limit value Win[t] reduces the regenerative braking force. As a result, the regenerative braking force from the second MG 3 corresponding to the regenerative power amount that exceeds the input limit value Win[t] and thus cannot be used to charge the battery 6 cannot be applied to the hybrid vehicle 100.

To compensate for the lost regenerative braking force from the second MG 3 corresponding to the regenerative power amount that exceeds the input limit value Win[t] and thus cannot be used to charge the battery 6, it is necessary to increase the braking force of the engine brake applied to the vehicle. The increased braking force of the engine brake, however, increases the RPM of the engine 1. The increased RPM of the engine 1 increases the amounts of exhaust gas and air to be supplied to the purification apparatus 13 (the catalyst for exhaust gas purification) from the engine 1 to promote the deterioration of the catalyst for exhaust gas purification.

Thus, a trade-off is found between the prevention of the reduced battery performance of the battery 6 with the input limit value Win[t] and the prevention of the promotion of deterioration of the catalyst for exhaust gas purification. Only the prevention of the reduced battery performance automatically promotes the deterioration of the catalyst for exhaust gas purification to reduce the exhaust gas purification performance.

To address this, the present embodiment achieves control such that the ratio between the regenerative braking force and the braking force of the engine brake during the release of the accelerator pedal can be varied on the basis of the states of the catalyst for exhaust gas purification and the battery 6. Specifically, when it is determined that the deterioration of the catalyst for exhaust gas purification may be promoted, the applied regenerative braking force is increased. In other words, the input limit value Win[t] is changed by a certain amount to relax the input limit, and the battery 6 is charged with a more regenerative power generated by the second MG 3 to increase the regenerative braking force applied to the vehicle. The increased regenerative braking force applied to the vehicle reduces the braking force of the engine brake (the RPM of the engine 1) to suppress the deterioration of the catalyst of exhaust gas purification.

In the present embodiment, a catalyst deterioration degree Ds is used as an exemplary index for finding the state of the catalyst for exhaust gas purification. The catalyst deterioration degree Ds represents the degree of deterioration of the catalyst based on the exhaust amount of the exhaust gas or the like in accordance with the RPM of the engine 1.

Figure 7:
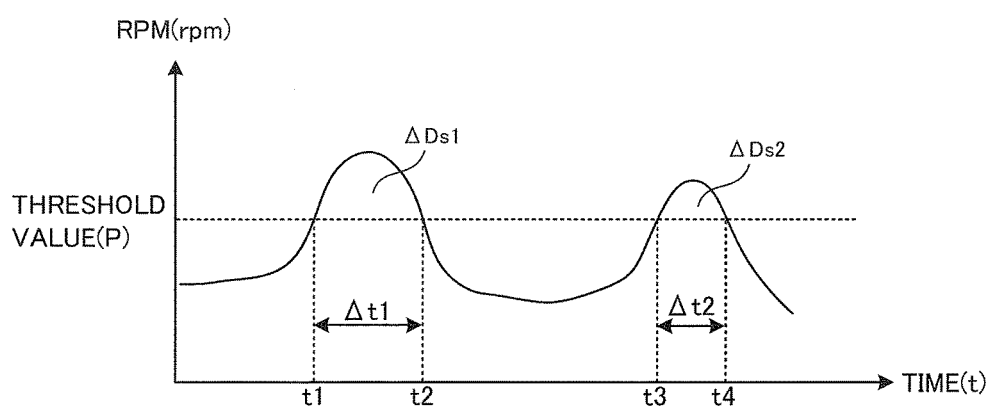
FIG. 7 A graph showing the relationship between the RPM of an engine and the deterioration of a catalyst in Embodiment 1.

FIG. 7 is a graph showing the RPM of the engine 1 detected by the RPM sensor 12. As described above, as the RPM of the engine 1 is increased, the engine 1 emits more exhaust gas and air to be supplied to the catalyst for exhaust gas purification to reduce the purification performance of the catalyst. An approach to this problem is to preset a threshold value of RPM of the engine 1 associated with the reduction in purification performance of the catalyst, that is, a threshold value P of RPM of the engine 1 (engine RPM threshold value) associated with the exhaust amount of exhaust gas or the like at which the deterioration of the catalyst is promoted.

The threshold value P can be provided, for example by previously determining the relationship between the exhaust amount of exhaust gas or the like and the state of promoted deterioration of the catalyst by test or design and then setting the RPM of the engine 1 associated with the exhaust amount of the exhaust gas or the like at which the state of promoted deterioration of the catalyst exceeds a predetermined value. In other words, the threshold value P is a threshold value for identifying the state of the promoted deterioration of the catalyst for exhaust gas purification resulting from the increased RPM of the engine 1 due to the application of the braking force of the engine brake.

Since the deterioration of the catalyst is increased with the time of contact with the exhaust gas per unit time, the total value of time periods $\Delta t$ (time accumulated value) can be used as the catalyst deterioration degree Ds, where $\Delta t$ represents a time period for which the engine 1 rotates at an RPM exceeding the threshold value P as shown in FIG. 7. The catalyst deterioration degree Ds can be calculated as the total value of the time periods $\Delta t$ ($\Delta t1+\Delta t2+\ldots$) for which the engine 1 rotates at an RPM exceeding the threshold value P.

The exhaust amount of the exhaust gas or the like in contact with the catalyst varies depending on the RPM of the engine 1. Thus, as shown in FIG. 7, a catalyst deterioration degree $\Delta Ds1$ for $\Delta t1$ may be calculated as an sum value (an area surrounded by a dotted line and a solid line exceeding the threshold value P) of RPMs exceeding threshold value P for $\Delta t1$ (differences obtained by subtracting the threshold value P from the RPMs of the engine 1 detected by the RPM sensor 12 when the threshold value P is exceeded), and the total value of $\Delta Ds1$, $\Delta Ds2\ldots$ for time periods $\Delta t1$, $\Delta t2$, $\ldots$ may be calculated as the catalyst deterioration degree Ds. Alternatively, the number of times the RPM of the engine 1 exceeds the threshold value P may be calculated as the catalyst deterioration degree Ds. The catalyst deterioration degree Ds in the present embodiment can be calculated on the basis of one or any combination of the time period for which the engine 1 is driven at an RPM exceeding the threshold value P, the number of times the threshold value P is exceeded, and the RPM difference between the RPM of the engine 1 when the threshold value P is exceeded and the threshold value P.

The present embodiment employs a battery deterioration degree Db as an exemplary index for founding the state of the battery 6. The battery deterioration degree Db represents the degree of an excess input power over the input limit value Win[t] for preventing the precipitation of lithium metal.

Figure 8:
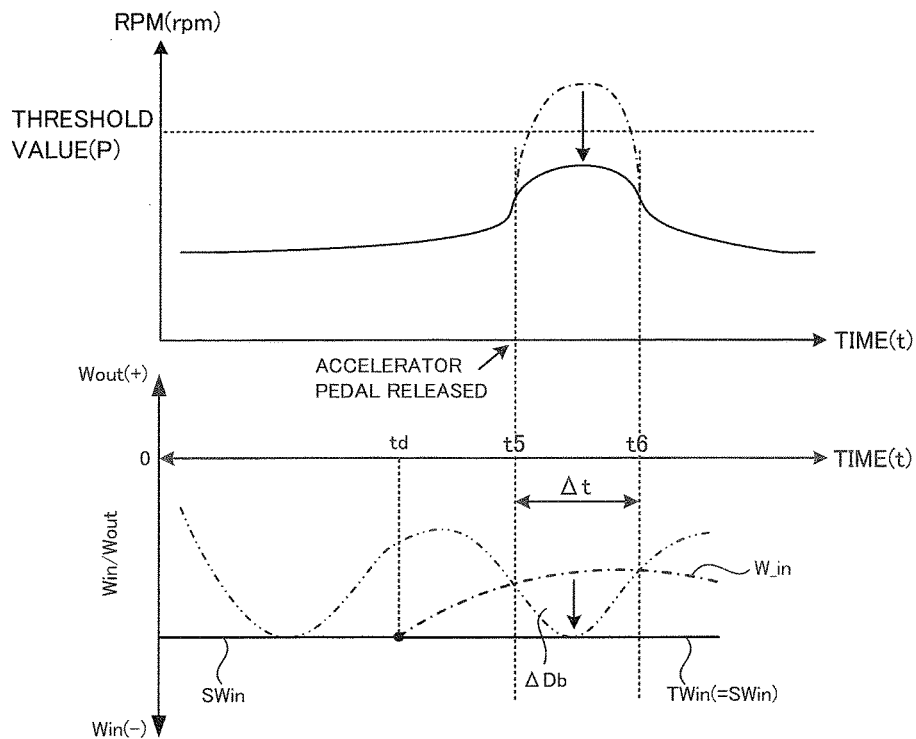
FIG. 8 Graphs showing the relationship between the RPM of the engine and the limitation of input to the battery with the deterioration of the catalyst for exhaust gas purification taken into account in Embodiment 1.

FIG. 8 shows graphs representing the relationship between the RPM of the engine 1 and the limitation of the input to the battery 6 with the deterioration of the catalyst for exhaust gas purification taken into account in the present embodiment. As shown in FIG. 8, when the regenerative power exceeding the input limit value Win[t] is permitted to reduce the braking force of the engine brake (engine RPM) applied to the vehicle, the regenerative power exceeding the input limit value Win[t] for preventing the precipitation of lithium metal is input.

Since the input of the regenerative power exceeding the input limit value Win[t] contributes to the promotion of precipitation of lithium metal, the regenerative power can be used as a parameter for evaluating a reduction in battery performance of the battery 6.

More specifically, the battery 6 may experience more precipitation of lithium metal when the allowable input current value Ilim[t] is exceeded. Since exceeding the allowable input current value Ilim[t] means the state in which lithium metal is actually precipitated or lithium metal tends to be precipitated, the time period for which the allowable input current value Ilim[t] is exceeded can be regarded as the battery deterioration degree. It is assumed that Win[t] represents the input limit value for preventing the precipitation of lithium metal, TWin[t] represents the input limit value when Win[t] is changed by a certain amount since the catalyst deterioration degree is considered, and SWin[t] represents the input limit value serving as the upper limit value of the input limit value Win[t] set in accordance with the battery temperature TB and the SOC of the battery 6 (Win[t] <TWin[t]≤SWin[t]).

In the example of FIG. 8, the input limitation is started with Win[t] smaller than SWin[t] at a time tb. In the present embodiment, when the accelerator pedal is released to brake the vehicle, the catalyst deterioration degree is taken into account to change Win[t] by the certain amount to permit the input of the regenerative power up to TWin[t]. At this point, the excess regenerative power over the input limit value Win[t] occurs. In the example of FIG. 8, TWin[t]=SWin[t], and Win[t] is changed (increased) to SWin[t] serving as the upper limit value of the input limit value.

The excess regenerative power over the input limit value Win[t] is input to the battery 6 for a time period Δt from a time t5 to a time t6. For the time period Δt, the RPM of the engine 1 is reduced since the battery 6 receives the excess regenerative power over the input limit value Win[t], and the precipitation of lithium metal, that is, the reduction in battery performance is easily promoted since the battery 6 receives the excess regenerative power over the input limit value Win[t]. Thus, the time period Δt from the time t5 to the time t6 is regarded as the degree of battery performance reduction, and the time period for which the excess regenerative power over the input limit value Win[t] is received (time period for which the excess regenerative power is input) is calculated as the battery deterioration degree Db.

In the example of FIG. 8, the battery deterioration degree Db can be calculated as the total value of the time periods Δt (Δt1+Δt2+ . . . ) for which the excess regenerative power over the input limit value Win[t] is input. The vehicle control apparatus 10 monitors the regenerative power based on the current value IB and the voltage value VB and can measure the time period for which the regenerative power exceeding the input limit value Win[t] is input to the battery 6 when the input limit value is set at TWin[t].

Since the reduction in battery performance of the battery 6 caused by the precipitation of lithium metal varies depending on the magnitude of the regenerative power exceeding the input limit value Win[t], a battery deterioration degree ΔDb1 for the time period Δt may be calculated as an excess power amount (an area surrounded by a chain line and a chain double-dashed line in the time period Δt) over the input limit Win[t] for the time period Δt as shown in FIG. 8, and the accumulated value of ΔDb1, ΔDb2, . . . for time periods Δt1, Δt2, . . . may be calculated as the battery deterioration degree Db. Alternatively, the number of times the regenerative power exceeding the input limit value Win[t] is input may be calculated as the battery deterioration degree Db. The battery deterioration degree Db in the present embodiment can be calculated on the basis of one or any combination of the time period for which the regenerative power exceeding the input limit value Win[t] is input, the number of times the regenerative power exceeding the input limit value Win[t] is input, and the input amount of the regenerative power exceeding the input limit value Win[t] (a power amount difference between the input amount of the regenerative power exceeding the input limit value Win[t] and the input limit value Win[t]), when the input of the regenerative power exceeding the input limit value Win[t] of the battery 6 is permitted.

Figure 9:
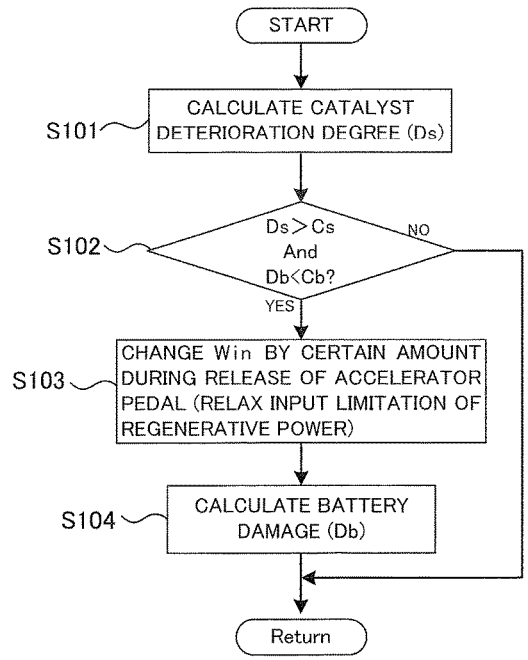
FIG. 9 A diagram showing a flow of processing of controlling the limitation of input to the battery variably based on a catalyst deterioration degree in Embodiment 1.

FIG. 9 shows a control flow for controlling the input limit value Win[t] of the battery 6 variably based on the catalyst deterioration degree Ds and the battery deterioration degree Db. The catalyst deterioration degree Ds and the battery deterioration degree Db can be set at values larger than zero, for example.

In the present embodiment, a threshold value is set for each of the catalyst deterioration degree Ds and the battery deterioration degree Db. When the catalyst deterioration degree Ds is larger than a threshold value Cs, and the battery deterioration degree Db is smaller than a threshold value Cb, the input limit value Win[t] of the battery 6 for preventing the precipitation of lithium metal is increased by a certain amount. The increase in acceptable amount of regenerative power without limiting the input power to Win[t] increases the regenerative braking force when the accelerator pedal is released to brake the vehicle, thereby holding the braking force of the engine brake (RPM of the engine 1) low (see FIG. 8).

As shown in FIG. 9, the vehicle control apparatus 10 performs the calculation and setting of the allowable input current value Ilim[t] and the input limit value Win[t] and also obtains the RPM of the engine 1 output from the RPM sensor 12 through the engine control apparatus 11 or directly during the time period from ON to OFF of the ignition switch. The vehicle control apparatus 10 calculates the time period for which the engine 1 is driven at an RPM exceeding the threshold value P, and calculates the catalyst deterioration degree Ds (the accumulated value of Δt or ΔDs) each time it calculates the time period for which the engine 1 is driven at an RPM exceeding the threshold value P (S101).

Next, the vehicle control apparatus 10 determines whether or not the catalyst deterioration degree Ds is larger than the threshold value Cs and the battery deterioration degree Db is smaller than the threshold value Cb (S102). When no history is present in which the input limit value is changed from Win[t] to TWin[t] to input the regenerative power since the catalyst deterioration degree is considered, that is, when the change of Win[t] by a certain amount to permit the input of the regenerative power exceeding Win[t] has not been performed, the initial value (for example, zero) can be used as the battery deterioration degree Db.

When it is determined that the catalyst deterioration degree Ds is larger than the threshold value Cs and that the battery deterioration degree Db is smaller than the threshold value Cb, the vehicle control apparatus 10 changes the input limit value Win[t] by a certain amount to set the input limit value TWin[t] larger than the input limit value Win[t] as the input limit value when the accelerator pedal is released to brake the vehicle (S103). For example, the vehicle control apparatus 10 can set SWin[t] serving as the upper limit value of the input limit value set in accordance with the battery temperature TB and the SOC of the battery 6. Although TWin[t] is set at SWin[t], the present invention is not limited thereto. TWin[t] can be set as appropriate within a range of Win[t]<TWin[t]≤SWin[t].

With the change of the input limit value Win[t] by the certain amount when the accelerator pedal is released to brake the vehicle, the vehicle control apparatus 10 measures each time period of input of the excess regenerative power over the input limit value Win[t] and accumulates the measured input time periods to calculate the battery deterioration degree Db (S104). The vehicle control apparatus 10 obtains the current value IB and the voltage value VB which are values detected by the current sensor 63 and the monitor unit 62, respectively. The vehicle control apparatus 10 monitors the regenerative power based on the obtained current value IB and voltage value VB and measures the time period for which the regenerative power exceeding the input limit value Win[t] is input. Each time the time period for which the regenerative power exceeding the input limit value Win[t] is input is calculated, the vehicle control apparatus 10 calculates the battery deterioration degree Db (the accumulated value of Δt or ΔDb).

When it is determined that the catalyst deterioration degree Ds is smaller than the threshold value Cs or that the battery deterioration degree Db is larger than the threshold value Cb, the vehicle control apparatus 10 does not change the input limit value Win[t] by the certain amount and sets the input limit value Win[t] for preventing the precipitation of lithium metal as the input limit value for the regenerative power when the accelerator pedal is released to brake the vehicle.

An upper limit value can be previously set for the catalyst deterioration degree Ds. For example, a catalyst deterioration degree assumed after the use limit of 10 years can be set as the upper limit value. The threshold value Cs of the catalyst deterioration degree Ds can be set arbitrarily based on the upper limit value of the catalyst deterioration degree, for example. The threshold value Cs can be a fixed or variable value (for example, a value in accordance with the period of use).

Similarly, an upper limit value can also be previously set for the battery deterioration degree Db. For example, a reduction in battery performance (deterioration amount) assumed after the use limit of 10 years can be set as the upper limit value. The threshold value Cb of the battery deterioration degree Db can be set arbitrarily based on the upper limit value of the battery deterioration degree, for example. The threshold value Cb can also be a fixed or variable value (for example, a value in accordance with the period of use).

Figure 10:
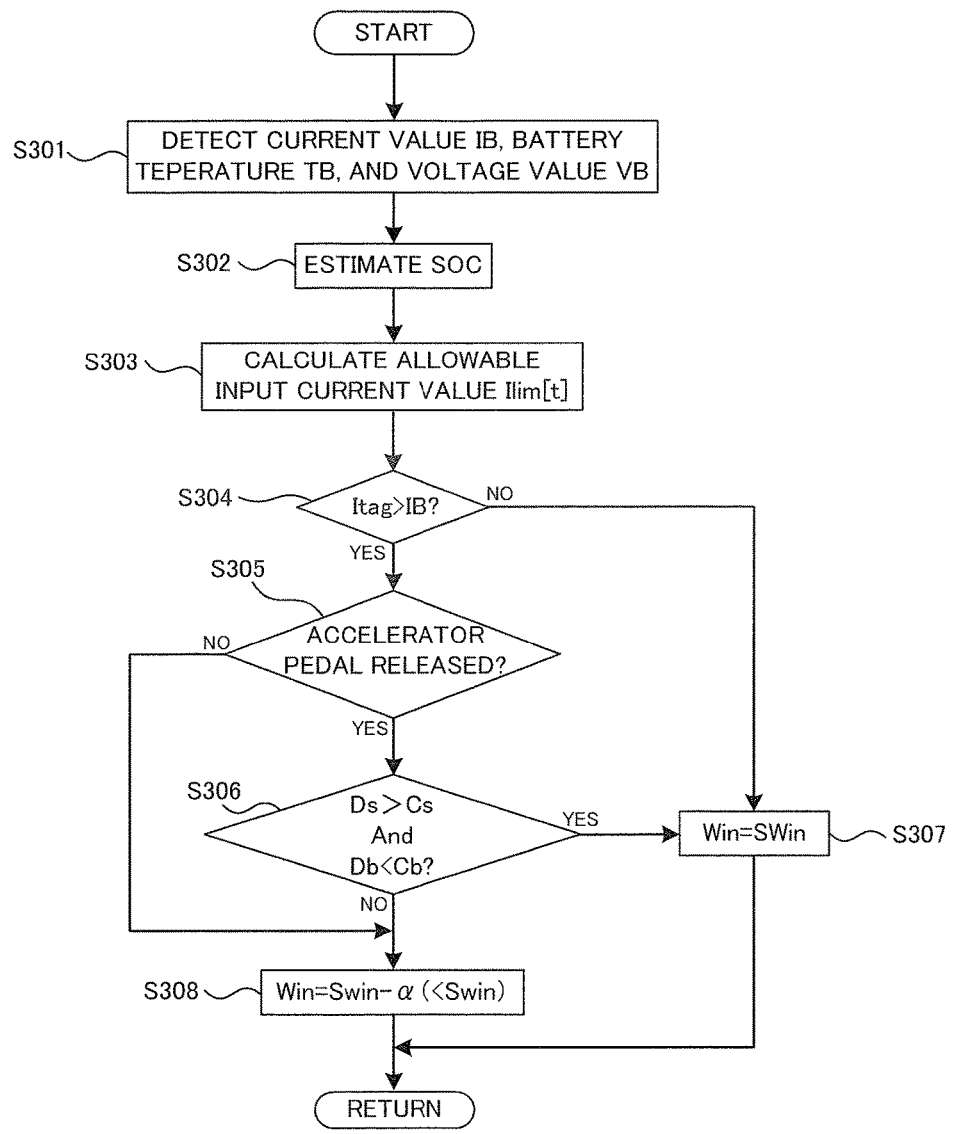
FIG. 10 A diagram showing a flow of processing of the limitation of input to the battery in the hybrid vehicle in Embodiment 1.

FIG. 10 is a diagram showing a flow of processing of limiting the input to the battery 6 in the hybrid vehicle 100 in which the processing of varying the input limit value Win[t] for preventing the precipitation of lithium metal with the promotion of catalyst deterioration taken into account as shown in FIG. 9 is applied. The processing shown in FIG. 10 is performed by the vehicle control apparatus 10.

As shown in FIG. 10, at step S301, the vehicle control apparatus 10 detects the voltage VB of the battery 6 based on the output from the monitor unit 62. The vehicle control apparatus 10 also detects the current value IB of the battery 6 based on the output from the current sensor 63. In addition, the vehicle control apparatus 10 detects the battery temperature TB of the battery 6 based on the output from the temperature sensor 64.

At step S302, the vehicle control apparatus 10 estimates the SOC of the battery 6. The estimation of the SOC is performed as described above.

At step S303, the vehicle control apparatus 10 calculates the allowable input current value Ilim[t] based on the expression (2). After the calculation of the allowable input current value Ilim[t], the vehicle control apparatus 10 controls the input/output (charge/discharge) of the battery 6 based on the allowable input current value Ilim[t]. At this point, the vehicle control apparatus 10 calculates SWin[t] set in accordance with the battery temperature TB and the SOC of the battery 6 and sets the calculated SWin[t] as the input limit value.

Next, at step S304, the vehicle control apparatus 10 determines whether or not the current value IB exceeds the input current limit value Itag in the input/output control for the battery 6 based on the allowable input current value Ilim[t].

When it is determined that the current value IB does not exceed the input current limit value Itag, the vehicle control apparatus 10 proceeds to step S307 in which it does not change the input limit value set at SWin[t] and controls the input/output (charge/discharge) of the battery 6 with SWin[t] as the input limit value.

When it is determined at step S304 that the current value TB exceeds the input current limit value Itag, the vehicle control apparatus 10 proceeds to step S305 in which it determines whether or not the accelerator pedal is released on the basis of the value detected by the accelerator position sensor 14. In other words, the vehicle control apparatus 10 determines whether or not the vehicle is decelerated in response to the release of the accelerator pedal.

When it is determined that the accelerator pedal is not released, the vehicle control apparatus 10 proceeds to step S308 in which it calculates Win[t] based on the input current limit value Itag and performs the control of the regenerative power input by using Win[t] as the upper limit of the input limit value.

When it is determined at step 305 that the accelerator pedal is released, the vehicle control apparatus 10 proceeds to step S306 in which it refers to the catalyst deterioration degree Ds and the battery deterioration degree Db to determine whether or not the catalyst deterioration degree Ds is larger than the threshold value Cs and whether or not the battery deterioration degree Db is smaller than the threshold value Cb. As shown in the example of FIG. 9, the catalyst deterioration degree Ds and the battery deterioration degree Db can be previously calculated on the basis of the RPM of the engine 1 and the regenerative power exceeding Win[t] calculated on the basis of the input current limit value Itag for preventing the promotion of catalyst deterioration (or the time period for which the exceeding regenerative power is input) and can be stored in the memory 10a.

When it is determined that the catalyst deterioration degree Ds is larger than the threshold value Cs and that the battery deterioration degree Db is smaller than the threshold value Cb, the vehicle control apparatus 10 proceeds to step 307 in which it increases Win[t] calculated on the basis of the input current limit value Itag by a certain amount. For example, SWin[t] (>Win[t]) can be set.

When it is determined that the condition is not satisfied that the catalyst deterioration degree Ds is larger than the threshold value Cs and that the battery deterioration degree Db is smaller than the threshold value Cb, the vehicle control apparatus 10 proceeds to step S308 in which it does not increase Win[t] by the certain amount and performs the control of the regenerative power input with the upper limit of the input limit value set at Win[t] calculated on the basis of the input current limit value Itag.

In the present embodiment, when both the battery deterioration degree and the catalyst deterioration degree for exhaust gas purification are low, the input limit value is not changed by the certain amount and the control of the regenerative power charge is performed on the basis of the input limit value Win[t] for preventing the precipitation of lithium metal, and in association with the limitation of the acceptable amount of the regenerative power to the low level, the braking force of the engine brake is applied with no consideration to the catalyst deterioration degree.

When the battery deterioration degree is not high but the catalyst deterioration degree is high, the input limit value is changed by the certain amount to increase the acceptable amount of the regenerative power in order to prevent the promotion of deterioration of the catalyst for exhaust gas purification, thereby performing the control of the regenerative power input intended to prevent the promotion of catalyst deterioration.

Especially when the catalyst deterioration degree exceeds the threshold value Cs, the input limitation of the input power to Win[t] is not performed and the acceptable amount of the regenerative power is increased by using SWin[t] as the upper limit value until the battery deterioration degree of the battery 6 exceeds the threshold value Cb, so that the RPM of the engine 1 is held low to prevent the promotion of catalyst deterioration. In other words, the control of the regenerative power input is performed such that the prevention of the promotion of catalyst deterioration is preferentially performed even when the battery performance of the battery 6 is reduced to the threshold value Cb.

When the battery deterioration degree of the battery 6 exceeds the threshold value Cb, the input of the regenerative power is limited to Win[t] assuming that a further reduction in battery performance is not permitted. Specifically, even when the catalyst deterioration degree exceeds the threshold value Cs, the prevention of the reduced battery performance of the battery 6 is preferentially performed and the promotion of catalyst deterioration is permitted, so that the control of the regenerative power input for preventing the precipitation of lithium metal is performed.

In the control of the regenerative power input with the catalyst deterioration degree taken into account in the present embodiment, input limitation of limiting the input power to Win[t] for preventing the promotion of catalyst deterioration is not performed, but the input control is performed in accordance with the battery temperature TB and the SOC of the battery 6 as described above.

During the driving control (EV running) for the hybrid vehicle 100 using only the electric power of the battery 6, the engine 1 can be stopped. In the control of the regenerative power input with the catalyst deterioration degree taken into account in the present embodiment, the control of changing the input limit value by the certain amount to prevent the promotion of catalyst deterioration may not be performed during the stop of the engine 1. In addition, it is possible to perform control such that the input limit value Win[t] is changed by the certain amount and an excess regenerative power over Win[t] is input to an auxiliary battery, not shown.

The driving control (EV running) for the hybrid vehicle 100 using only the electric power of the battery 6 can also be performed without stopping the engine 1. In this case, the control of the regenerative power input can be performed with the catalyst deterioration degree taken into account as in the present embodiment. It is also possible to start the engine 1 when the accelerator pedal is released to brake the vehicle after the state in which the engine 1 is stopped, thereby performing the control of the regenerative power input with the catalyst deterioration degree taken into account in the present embodiment.

In the example of charge/discharge control including the limitation of the input to the battery 6, the description has been made of the input limit value Win[t] for preventing the precipitation of lithium metal in the battery 6 which is the lithium-ion secondary battery. The control of the regenerative power input with the catalyst deterioration degree taken into account in the present embodiment is applicable to input limitation for preventing a reduction in battery performance of the battery 6 caused for another reason.

For example, when the lithium-ion secondary battery is repeatedly charged at a high input value for a predetermined time period, a high rate deterioration phenomenon (a phenomenon involving a sudden increase in internal resistance, unlike wear deterioration due to age deterioration from long-term use) occurs in which the voltage of the lithium-ion secondary battery drops during charge operation. Since the high rate deterioration phenomenon involves the sudden voltage increase, the input/output (battery performance) of the lithium-ion secondary battery is reduced, and thus the charge/discharge control of limiting the input/output of the lithium-ion secondary battery is performed.

Since such input limitation for preventing the reduced battery performance due to the high rate deterioration also reduces the regenerative braking force, the braking force of the engine brake is increased, and the catalyst deterioration results. The promotion of the catalyst deterioration, however, can be prevented by applying the control of the regenerative power input with the catalyst deterioration degree taken into account in the present embodiment.

It is also possible to calculate the battery deterioration degree for each of deterioration modes in the battery 6 (a first deterioration mode relating to the precipitation of lithium metal and a second deterioration mode relating to the high rate deterioration) and to perform the control of regenerative power input with the catalyst deterioration degree taken into account until each battery deterioration degree exceeds its threshold value. The battery deterioration degrees calculated for the deterioration modes may be summed to calculate a single battery deterioration degree which is then taken into account to perform the control of regenerative power input. Wear deterioration due to age deterioration from long-term use of the battery 6 can also be considered as the battery deterioration degree. For example, a map can previously specify the battery deterioration degree from the wear deterioration in accordance with the period of use (frequency of use) of the battery 6, the deterioration degree from the wear deterioration can be added to the battery deterioration degree calculated for each deterioration mode, and the result can be used as the battery deterioration degree Ds of the battery 6.

The above description has been made of the exemplary aspect in which, provided that the input limitation is performed in accordance with the battery temperature TB and the SOC of the battery 6, the input limit value Win[t] for preventing the precipitation of lithium metal is used to limit the regenerative power input, and Win[t] is changed by the certain amount when the promotion of catalyst deterioration is taken into account. The input control with the promotion of catalyst deterioration taken into account can be applied to the control of limiting the input to the battery 6 in accordance with the battery temperature TB and the SOC of the battery 6.

For example, in the input control of the input power based on SWin[t] reduced as the temperature rises at higher temperatures as shown in FIG. 5, the input limit value can be limited more than SWin[t] as the SOC of the battery 6 is increased as shown in FIG. 6. Since SWin[t] based on the battery temperature TB is set at Win[t] more limited in accordance with the SOC of the battery 6, Win[t] more limited in accordance with the SOC can be controlled to be changed by a certain amount by taking account of the promotion of catalyst deterioration. Conversely, Win[t] provided by limiting SWin[t] based on the SOC of the battery 6 more in accordance with the battery temperature of the battery 6 can be controlled to be changed by a certain amount with the promotion of catalyst deterioration taken into account.

When the input control with the promotion of catalyst deterioration taken into account is performed in the control of the input to the battery 6 in accordance with the battery temperature TB and the SOC of the battery 6, the battery 6 can be provided by using not only the lithium-ion secondary battery but also another secondary battery such as a nickel metal hydride battery to perform the input control with the promotion of catalyst deterioration taken into account in the present embodiment.

The invention claimed is:

1. A vehicle control apparatus for a hybrid vehicle including an engine, a motor for running the vehicle, and a battery configured to supply an electric power to the motor for running, comprising:

a controller configured to update an allowable input current value in accordance with a state of the battery and to control an input to the battery, the allowable input current value being a maximum current value to which the input to the battery is permitted, wherein the controller performs control such that limitation of the input to the battery in accordance with the allowable input current value is not performed if a deterioration degree of a catalyst for purifying an exhaust gas from the engine is larger than a predetermined value when a braking force of an engine brake and a regenerative braking force of the motor for running are applied to the vehicle during deceleration of the vehicle, wherein the controller performs first input control in which the allowable input current value is updated in accordance with at least one of a temperature or a state of charge (SOC) of the battery and the input to the battery is controlled and second input control in which the allowable input current value is updated in accordance with a charge state of the battery and the input to the battery is controlled, and the controller performs control such that the limitation of the input to the battery in accordance with the allowable input current value in the second input control is not performed, and permits an input of a regenerative power exceeding an input limit value of the battery based on the allowable input current value in the second input control in a range not exceeding an input limit value of the battery based on the allowable input current value in the first input control.

2. The vehicle control apparatus according to claim 1, wherein the controller performs control such that the limitation of the input to the battery in accordance with the allowable input current value is not performed when the deterioration degree of the catalyst is larger than a first predetermined value and a battery deterioration degree of the battery is smaller than a second predetermined value.

3. The vehicle control apparatus according to claim 1, wherein the controller determines whether or not an RPM of the engine detected by an RPM sensor exceeds a predetermined engine RPM threshold value, and calculates the deterioration degree of the catalyst based on a time period for which the engine is driven at an RPM exceeding the engine RPM threshold value, the number of times the engine RPM threshold value is exceeded, or an RPM difference between the RPM of the engine when the engine RPM threshold value is exceeded and the engine RPM threshold value, and the engine RPM threshold value is a threshold value for identifying a state of promotion of deterioration of the catalyst involved in an increase in the engine RPM due to application of the braking force of the engine brake.

4. The vehicle control apparatus according to claim 1, wherein the controller calculates the battery deterioration degree based on a time period for which the regenerative power exceeding the input limit value is input, the number of times the regenerative power exceeding the input limit value is input, or an input amount of the regenerative power exceeding the input limit value, when the input of the regenerative power exceeding the input limit value of the battery based on the allowable input current value is permitted.

5. The vehicle control apparatus according to claim 1, wherein the battery is a lithium-ion secondary battery, and the controller sets the allowable input current value such that a negative electrode potential of the lithium-ion secondary battery is not to fall below a reference potential for indicating precipitation of lithium metal.

6. A control method, in a hybrid vehicle including an engine, a motor for running the vehicle, and a battery configured to supply an electric power to the motor for running, of updating an allowable input current value in accordance with a state of the battery and to control an input to the battery, the allowable input current value being a maximum current value to which the input to the battery is permitted, the method comprising:

determining, using a controller, whether or not a deterioration degree of a catalyst for purifying an exhaust gas from the engine is larger than a predetermined value when a braking force of an engine brake and a regenerative braking force of the motor for running are applied to the vehicle during deceleration of the vehicle; and performing control, using the controller, such that limitation of the input to the battery in accordance with the allowable input current value is not performed when the deterioration degree of the catalyst is larger than the predetermined value, performing, using the controller, a first input control in which the allowable input current value is updated in accordance with at least one of a temperature or a state of charge (SOC) of the battery and the input to the battery is controlled and performing a second input control in which the allowable input current value is updated in accordance with a charge state of the battery and the input to the battery is controlled, and performing the control such that the limitation of the input to the battery in accordance with the allowable input current value in the second input control is not performed, and permits an input of a regenerative power exceeding an imput limit value of the battery based on the allowable input current value in the second input control in a range not exceeding an input limit value of the battery based on the allowable input current value in the first input control.

* * * * *